(12) United States Patent
Clarke et al.

(10) Patent No.: US 10,513,247 B2
(45) Date of Patent: Dec. 24, 2019

(54) BATTERY SWAPPING SYSTEM AND TECHNIQUES

(71) Applicant: Tesla, Inc., Palo Alto, CA (US)

(72) Inventors: Alan Clarke, Signal Hill, CA (US); Matthew Lee Brown, Redondo Beach, CA (US); Eric Orlando Gaffoglio, Anaheim Hills, CA (US); Samuel Milan Poznanovich, II, Hermosa Beach, CA (US)

(73) Assignee: Tesla, Inc., Palo Alto, CA (US)

( * ) Notice: Subject to any disclaimer, the term of this patent is extended or adjusted under 35 U.S.C. 154(b) by 370 days.

(21) Appl. No.: 14/889,833

(22) PCT Filed: May 22, 2014

(86) PCT No.: PCT/US2014/039090
§ 371 (c)(1),
(2) Date: Nov. 6, 2015

(87) PCT Pub. No.: WO2014/204614
PCT Pub. Date: Dec. 24, 2014

(65) Prior Publication Data
US 2016/0107619 A1 Apr. 21, 2016

Related U.S. Application Data

(60) Provisional application No. 61/837,082, filed on Jun. 19, 2013.

(51) Int. Cl.
*B60S 5/06* (2019.01)
*B66F 11/00* (2006.01)
(Continued)

(52) U.S. Cl.
CPC .............. *B60S 5/06* (2013.01); *B60L 50/66* (2019.02); *B60L 53/80* (2019.02); *B65G 49/05* (2013.01);
(Continued)

(58) Field of Classification Search
CPC . B60S 5/06; B65G 49/05; B65G 51/03; B66F 11/00; B60L 11/1822; B60L 11/1877; B60K 2001/0455; B60K 2001/0472
See application file for complete search history.

(56) References Cited

U.S. PATENT DOCUMENTS 4,596,506 A    6/1986  Bergardt et al.
5,998,963 A *  12/1999 Aarseth .................... B60K 1/04
                                                    104/34

(Continued)

FOREIGN PATENT DOCUMENTS

CN    202006784 U    10/2011
CN    202574160 U    12/2012
(Continued)

OTHER PUBLICATIONS

International preliminary report on patentability in application PCT/US2014/039090, dated Dec. 22, 2015, 5 pages.
(Continued)

*Primary Examiner* — Jacob J Cigna
*Assistant Examiner* — Lee A Holly
(74) *Attorney, Agent, or Firm* — Knobbe, Martens, Olson & Bear, LLP (57) ABSTRACT

A battery pack lift system includes: a frame having nutrunners mounted thereon according to a battery pack fastener pattern for a vehicle; a lift configured to raise and lower the frame with regard to the vehicle; a first air bearing positioned between the frame and the lift, the first air bearing configured to allow relative movement between the frame
(Continued)

and the lift; and a second air bearing positioned on the frame, the second air bearing configured to allow relative movement between a battery pack and the frame.

6 Claims, 13 Drawing Sheets

(51) Int. Cl.
B60L 53/80 (2019.01)
B60L 50/60 (2019.01)
B60K 1/04 (2019.01)
B65G 49/05 (2006.01)
B65G 51/03 (2006.01)

(52) U.S. Cl.
CPC .............. *B65G 51/03* (2013.01); *B66F 11/00* (2013.01); *B60K 2001/0455* (2013.01); *B60K 2001/0472* (2013.01); *Y02T 10/7005* (2013.01); *Y02T 10/705* (2013.01); *Y02T 10/7072* (2013.01); *Y02T 90/124* (2013.01); *Y02T 90/14* (2013.01)

(56) References Cited

U.S. PATENT DOCUMENTS

| | | | | |
|---|---|---|---|---|
| 6,485,247 | B1 * | 11/2002 | Groves | ..................... B66F 7/20 180/125 |
| 2007/0113921 | A1 * | 5/2007 | Capizzo | ............... B60K 15/063 141/231 |
| 2012/0217077 | A1 * | 8/2012 | Ojima | ...................... B60K 1/04 180/68.5 |
| 2012/0233850 | A1 * | 9/2012 | Hozumi | .............. B60L 11/1822 29/729 |
| 2014/0250653 | A1 * | 9/2014 | Droste | ................ B60L 11/1877 29/402.08 |

FOREIGN PATENT DOCUMENTS

| | | | | |
|---|---|---|---|---|
| GB | 2136330 A | * | 9/1984 | ............ B23P 19/042 |
| JP | 62-292580 A | | 12/1987 | |
| JP | 11-139167 A | | 5/1999 | |
| JP | 2000-053042 A | | 2/2000 | |
| KR | 10-2012-016088 A | | 9/2012 | |

OTHER PUBLICATIONS

International search report in application PCT/US2014/039090, dated Sep. 23, 2014, 9 pages.
State Intellectual Property Office; Office Action and Search Report; CN Application No. 201480032105.3; dated Jan. 24, 2017; 6 pgs.

* cited by examiner

BATTERY SWAPPING SYSTEM AND TECHNIQUES

CROSS-REFERENCE TO RELATED APPLICATION

This application claims the benefit of the filing date of U.S. Provisional Application 61/837,082, filed Jun. 19, 2013, and entitled "Battery Swapping System and Techniques," the entire contents of which are incorporated herein by reference.

BACKGROUND

Some vehicles are designed to use electricity as the source of power for propulsion. Such vehicles have an energy storage for holding the electric power, and such storage can be in form of a battery pack configured to be mounted on the vehicle. The battery pack has an electric connection to the vehicle, allowing the vehicle's propulsion motor or other drive unit to draw electric energy from the battery. In some situations the vehicle can feed electric energy back into the battery pack, for example during so-called regenerative braking.

Many battery packs are configured so that they can be recharged with electric energy as needed. Some vehicles have an external charge port for connecting an external energy source and thereby recharging the battery, and others may charge the battery via an onboard combustion engine. Another way to achieve energy replenishment is to exchange the current battery pack for a fully charged one. This technique can also be used when the old battery pack is in need of service, so as to allow the vehicle to continue driving.

SUMMARY

In a first aspect, a battery pack lift system includes: a frame having nutrunners mounted thereon according to a battery pack fastener pattern for a vehicle; a lift configured to raise and lower the frame with regard to the vehicle; a first air bearing positioned between the frame and the lift, the first air bearing configured to allow relative movement between the frame and the lift; and a second air bearing positioned on the frame, the second air bearing configured to allow relative movement between a battery pack and the frame.

Implementations can include any or all of the following features. The first air bearing comprises four air bearings positioned on a top of the frame. The second air bearing comprises four air bearings positioned on a bottom of the frame. The frame comprises a base, and a rack having the nutrunners mounted thereon. The first and second air bearings are mounted on the base. The rack is mounted on the base so as to be moveable at least vertically relative to the base. The battery pack lift system further includes a platform on the frame for holding the battery pack, the second air bearing positioned between the platform and the frame. The battery pack lift system further includes rollers on the platform. The battery pack lift system comprises a ramp configured for the vehicle to drive thereon, the ramp having an opening for the platform, wherein the frame and the lift are positioned underneath the opening. The battery pack lift system further includes at least one alignment pin mounted on the frame, the alignment pin configured for ensuring alignment between the battery pack and the frame.

In a second aspect, a method of exchanging a battery pack of a vehicle includes: positioning a battery pack lift system and the vehicle relative to each other, the battery pack lift system having a frame with nutrunners mounted thereon according to a battery pack fastener pattern for the vehicle and a lift configured to raise and lower the frame with regard to the vehicle; aligning the frame to a first battery pack on the vehicle, the alignment created using a first air bearing positioned between the frame and the lift; unfastening the first battery pack using the nutrunners and removing the first battery pack from the vehicle; aligning a second battery pack to the frame using a second air bearing on the frame, wherein the second battery pack obtains the alignment created for the first battery pack; and bringing the second battery pack to the vehicle using the lift, and fastening the second battery pack using the nutrunners.

Implementations can include any or all of the following features. The frame comprises a base, and a rack having the nutrunners mounted thereon, and the method further includes moving the rack at least vertically relative to the base as part of unfastening the first battery pack and fastening the second battery pack. The method further includes, before aligning the frame to the first battery pack, extending at least one alignment pin mounted on the frame, and using the alignment pin in aligning the second battery pack so as to obtain the alignment created for the first battery pack. The battery pack lift system has a ramp configured for the vehicle to drive thereon, and an opening in the ramp for a platform mounted on the frame, wherein the frame and the lift are positioned underneath the opening, and the method further includes moving the platform at least vertically using the lift as part of removing the first battery pack from the vehicle and bringing the second battery pack to the vehicle. The platform has rollers, and the method further includes, after removing the first battery pack from the vehicle, rolling off the first battery pack on a side of the platform, and, before aligning the second battery pack to the frame, rolling the second battery pack onto the platform on another side of the platform. The sides are opposite each other and wherein the first and second battery packs are rolled in a common direction.

DETAILED DESCRIPTION

This document describes systems and techniques for swapping an electrical energy storage system, such as a battery pack of a vehicle. Vehicles that have battery packs include electric vehicles and hybrid vehicles, to name just two examples. In some implementations, a system can be used to exchange the battery pack of an electric vehicle for another battery pack. For example, this can provide a more rapid way of replenishing the electric energy for the electric vehicle and can enable electric vehicles to travel essentially nonstop on long road trips.

In the following examples, the battery pack currently mounted on a vehicle is sometimes referred to as the "old" battery pack, and the battery pack to be mounted onto the vehicle is sometimes referred to as the "new" battery pack. This nomenclature is used for illustrative purposes only, and does not necessarily reflect any physical characteristics of either battery pack. In one example, the old battery pack is partially depleted (i.e., has a low state of charge) and is therefore being exchanged for the new one, which has a higher state of charge. In another example, however, the vehicle owner simply wishes to replace the old battery pack with a different one, and therefore exchanges it for the new one.

Figure 1:
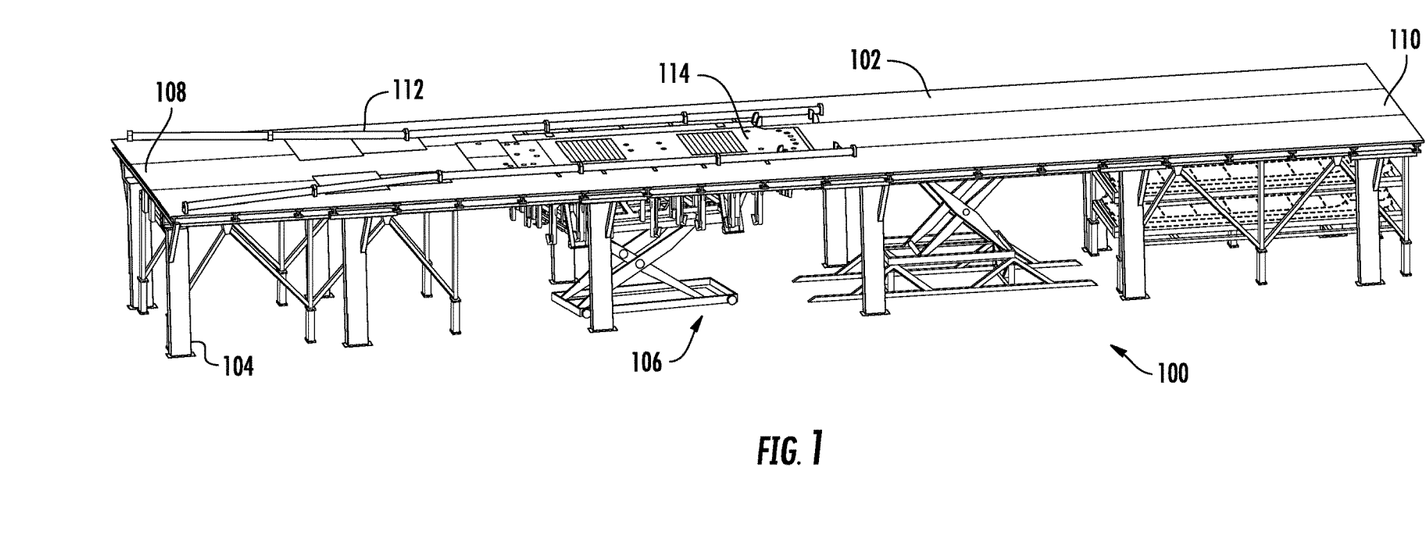
FIG. 1 shows an example of a battery-swapping station.

FIG. 1 shows an example of a battery-swapping station 100. Generally, the station has a ramp 102 that is supported by pillars 104. Equipment 106 is accommodated underneath the ramp and will be used in removing old battery packs and/or mounting new ones onto vehicles. In some implementations, the ramp can be positioned above ground level and can therefore have a sloping surface (not shown) that allows the vehicle to drive up onto the ramp. Here, the station is designed so that a vehicle will enter at one end 108 and, after being serviced, will exit the station at another end 110. In other implementations, however, the vehicle can exit the station on the same side as it entered.

The battery-swapping station 100 has vehicle guides 112 to ensure that the vehicle is properly positioned for the procedure. In some implementations, the guides can be placed on either side of the intended driving path so as to help steer the vehicle's wheels into the correct positions. For example, a guide can have generally cylindrical shape and be mounted so that it can be rotated around its longitudinal axis. If a vehicle wheel rolls into contact with such a guide, the rotation of the guide can prevent the wheel from climbing up on the guide and thereby help keep the vehicle in proper alignment on the station.

The battery-swapping station 100 has a platform 114 that currently fills a corresponding opening in the ramp 102. The platform is moveable in at least a vertical direction by way of some of the equipment 106. For example, the platform can be elevated from its current position until it contacts an underbody battery pack of the vehicle, and after the battery pack is unfastened from the vehicle the platform can support the weight of the battery pack, such as while lowering the battery pack in order to exchange it for another one. In some implementations, the ramp has one or more doors adjacent the platform. For example, such door(s) can be closed during vehicle entry and exit so that one or more vehicle wheels can roll on top of the door(s). During the service process, on the other hand, the door(s) can be opened, thereby creating more space between the platform and the opening in the ramp. For example, such space can accommodate access to the battery pack by equipment and/or a manual operator.

Figure 2:
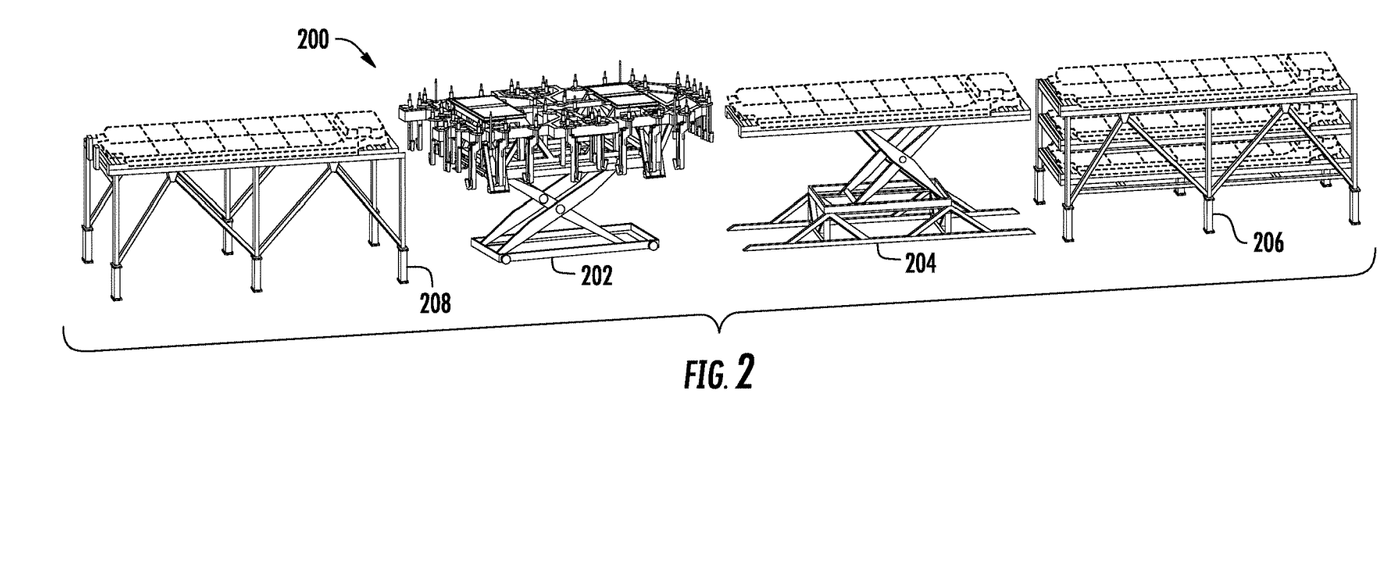
FIG. 2 shows an example of equipment for a battery-swapping station.

FIG. 2 shows an example of equipment 200 for a battery-swapping station. The equipment includes a battery pack lift system 202, a scissor lift 204, a rack of new battery packs 206, and a rack 208 for an old battery pack. Examples regarding these will be described below.

Figure 3:
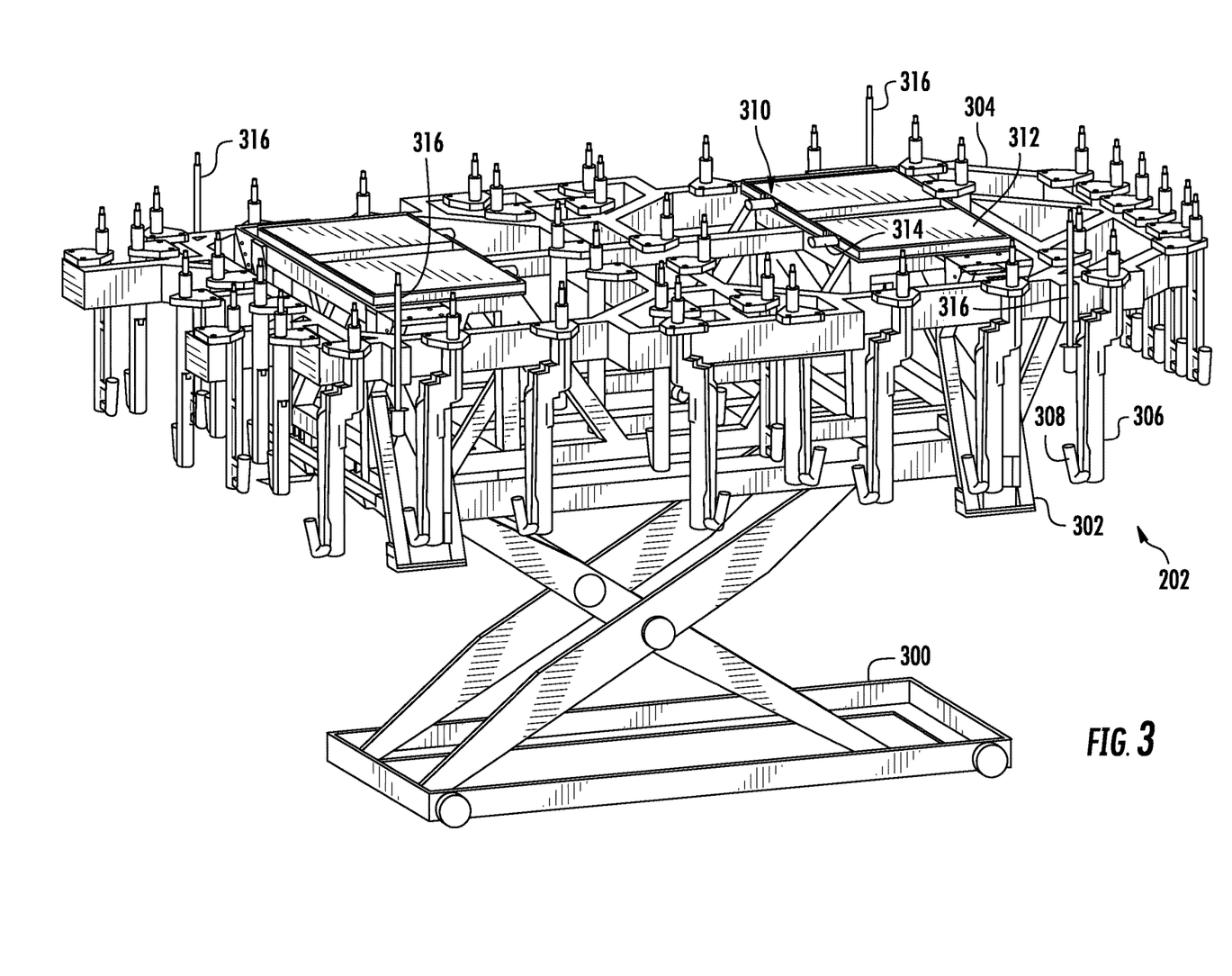
FIG. 3 shows an example of the battery pack lift system of FIG. 2.

FIG. 3 shows an example of the battery pack lift system 202 of FIG. 2. The system includes a lift 300, a frame 302 positioned on the lift 300, and a rack 304 positioned on a base portion of the frame 302. The rack 304 has mounted thereon a number of nutrunners 306 that are configured for use in fastening and unfastening battery packs.

The nutrunners 306 are here arranged in a battery pack fastener pattern for a particular vehicle. That is, there are here 39 individual nutrunners and they are each positioned so as to line up with an individual fastener (e.g., a bolt) that is used in securing a battery pack to that type of vehicle. In other implementations, more or fewer nutrunners can be used.

In this description, the term "nutrunner" is being used in a broad sense that includes a range of torque control devices suitable for fastening and unfastening battery packs from vehicles. For example, a nutrunner can be designed for use in selectively tightening or loosening nuts and/or bolts. The nutrunners can be powered in any suitable way, for example using one or more sources of pneumatic power (not shown) that supply pressure to the nutrunners by way of couplings 308.

In this figure and the previous one, the battery pack lift system 202 is shown without the platform 114 (FIG. 1) for clarity. That is, the platform or similar structure is normally mounted on top of the battery pack lift system to support the battery pack during operations. Particularly, the battery pack lift system has a number of air bearings 310 that allow relative motion between such a battery pack (e.g., supported by the platform) and the rest of the battery pack lift system. For example, each air bearing can have one or more surfaces 312 where friction is reduced by way of flowing air (e.g., by pressurized air emerging through orifices). Pressurized air can be supplied to the air bearing through one or more ports 314. In the illustrated example, four separate air bearings are installed.

Figure 4:
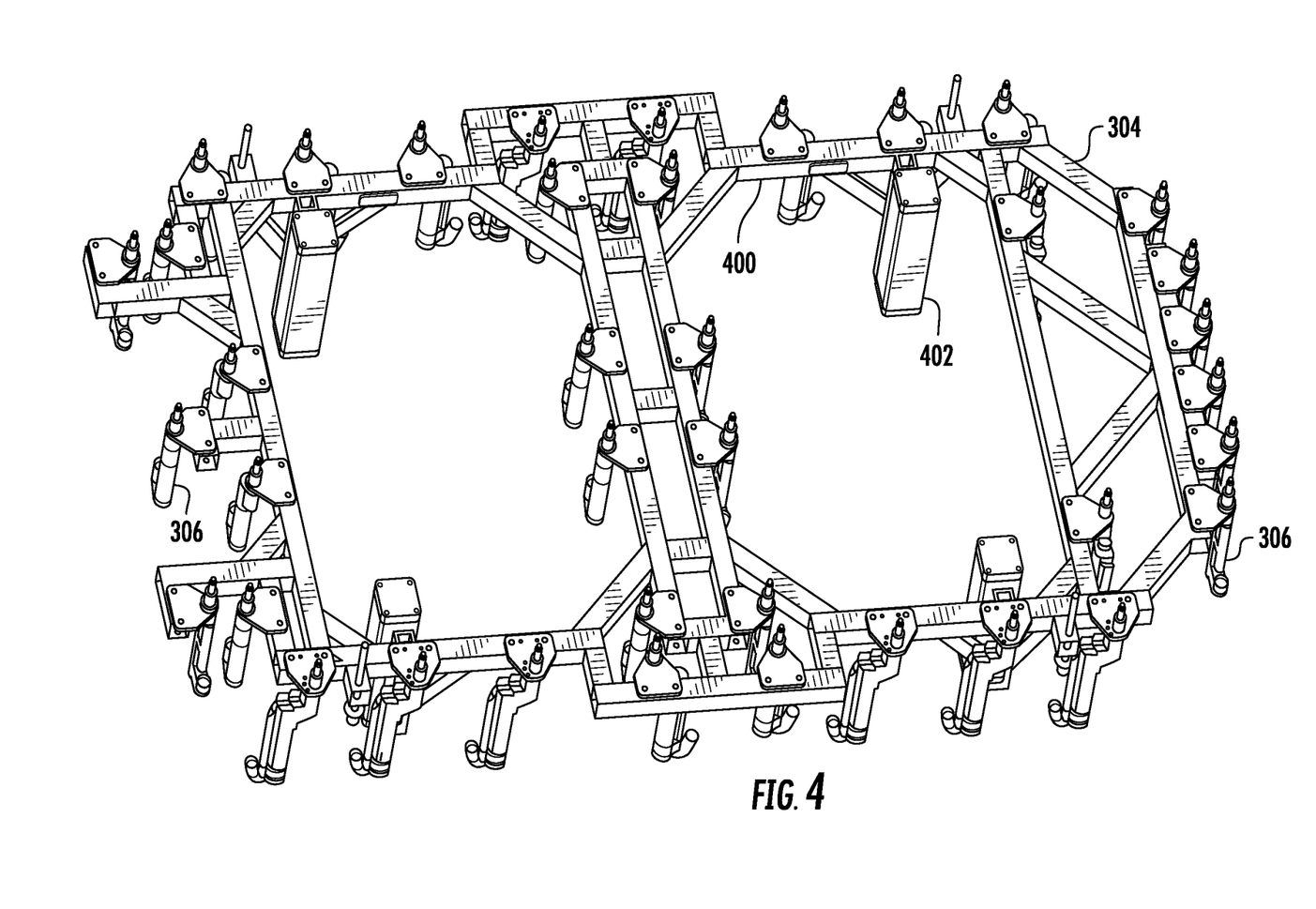
FIG. 4 shows an example of the nutrunner rack of the battery pack lift system of FIG. 3.

FIG. 4 shows an example of the nutrunner rack 304 of the battery pack lift system of FIG. 3. The rack generally comprises a framework 400 that has the nutrunners 306 mounted thereto, and attachments 402 that secure the rack to the frame 302 so that the rack can be raised and lowered relative to the frame. For example, the framework can be made from rectangular beams (e.g., of extruded aluminum) that are assembled into a suitable shape so as to be durable and allow the nutrunners to be positioned according to the fastener pattern of the type of battery pack that is to be serviced. The nutrunners can be attached to the framework in any suitable way, including, but not limited to, by braces. In this example, the fastener pattern of the battery pack reflects that all fasteners are oriented in the same direction as each other (here, vertically) and this can provide a more streamlined process of fastening and unfastening the battery pack. Other implementations can have more or fewer nutrunners arranged according to a similar or entirely different battery pack fastener pattern.

Figure 5:
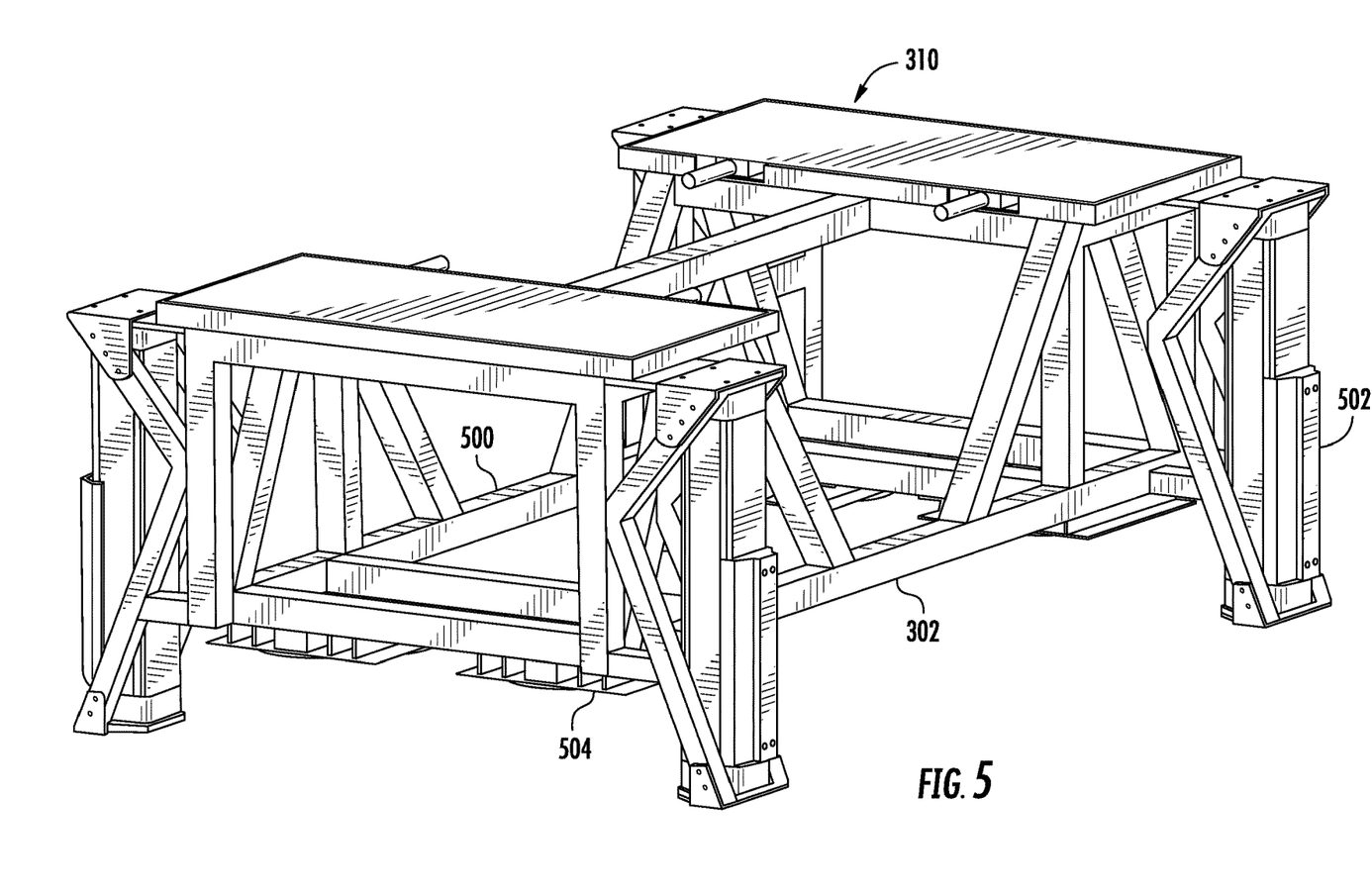
FIG. 5 shows an example of the frame of the battery pack lift system of FIG. 3.

FIG. 5 shows an example of the frame 302 of the battery pack lift system of FIG. 3. Generally, the frame comprises beams 500 arranged in a suitable framework to support the expected loads (e.g., battery pack and nutrunner rack). For example, extruded aluminum profiles having a square profile can be used. The frame has lifts 502 that interact with the attachments of the nutrunner rack to raise and lower the same. For example, the lifts can be pneumatic or hydraulic. The frame has the air bearings 310 mounted thereon so as to allow the necessary relative movement between the battery pack and the rest of the lift system.

The frame 302 also has additional air bearings 504 mounted thereon. These can operate in an identical or similar way as the air bearings 310 and are used for providing the necessary relative movement between the frame and the scissor lift 300 (FIG. 3). In this example, the frame has four of the air bearings 504, positioned toward the corners of the frame.

Figure 6:
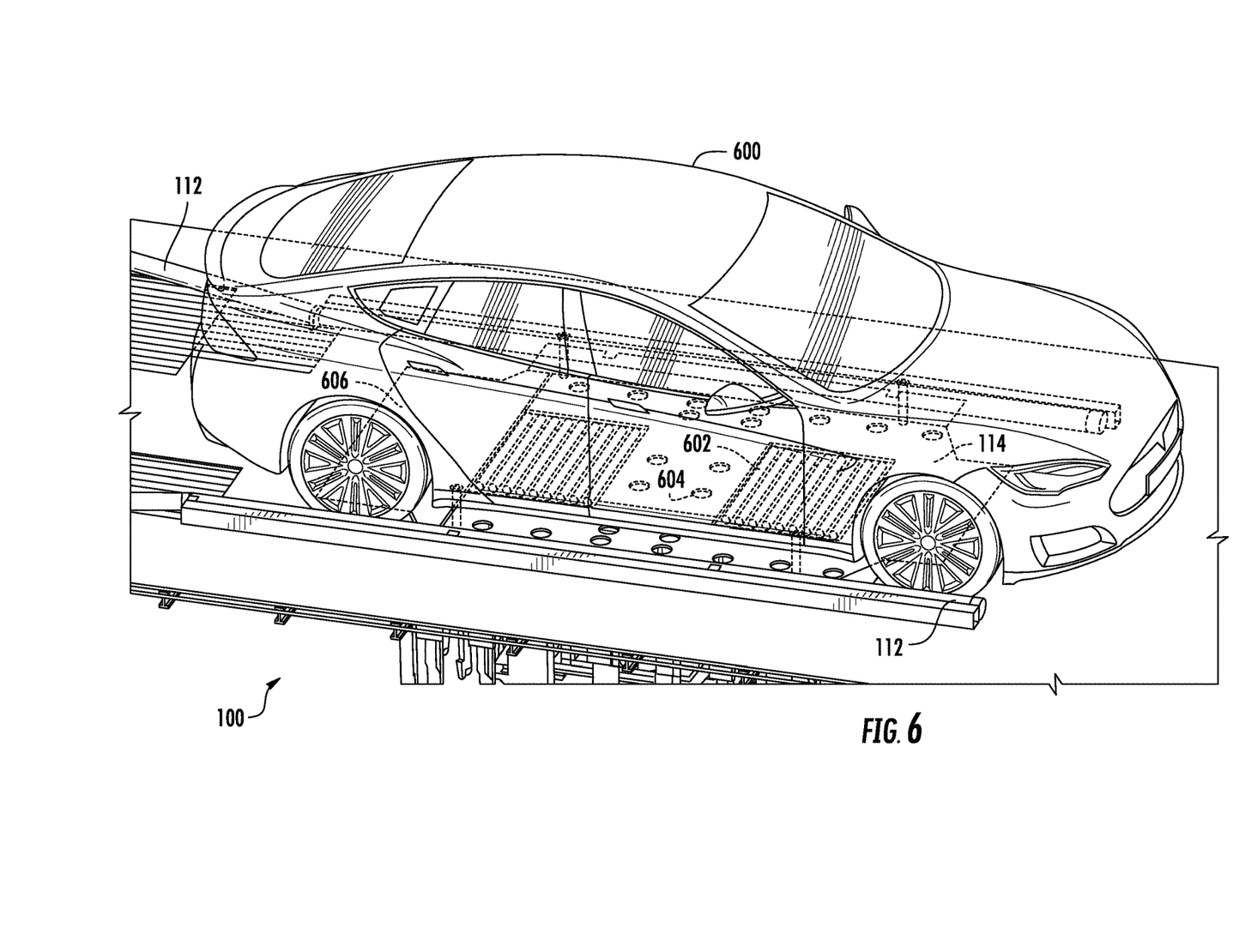
FIG. 6 shows an example of a vehicle on the battery-swapping station of FIG. 1.
Figure 7:
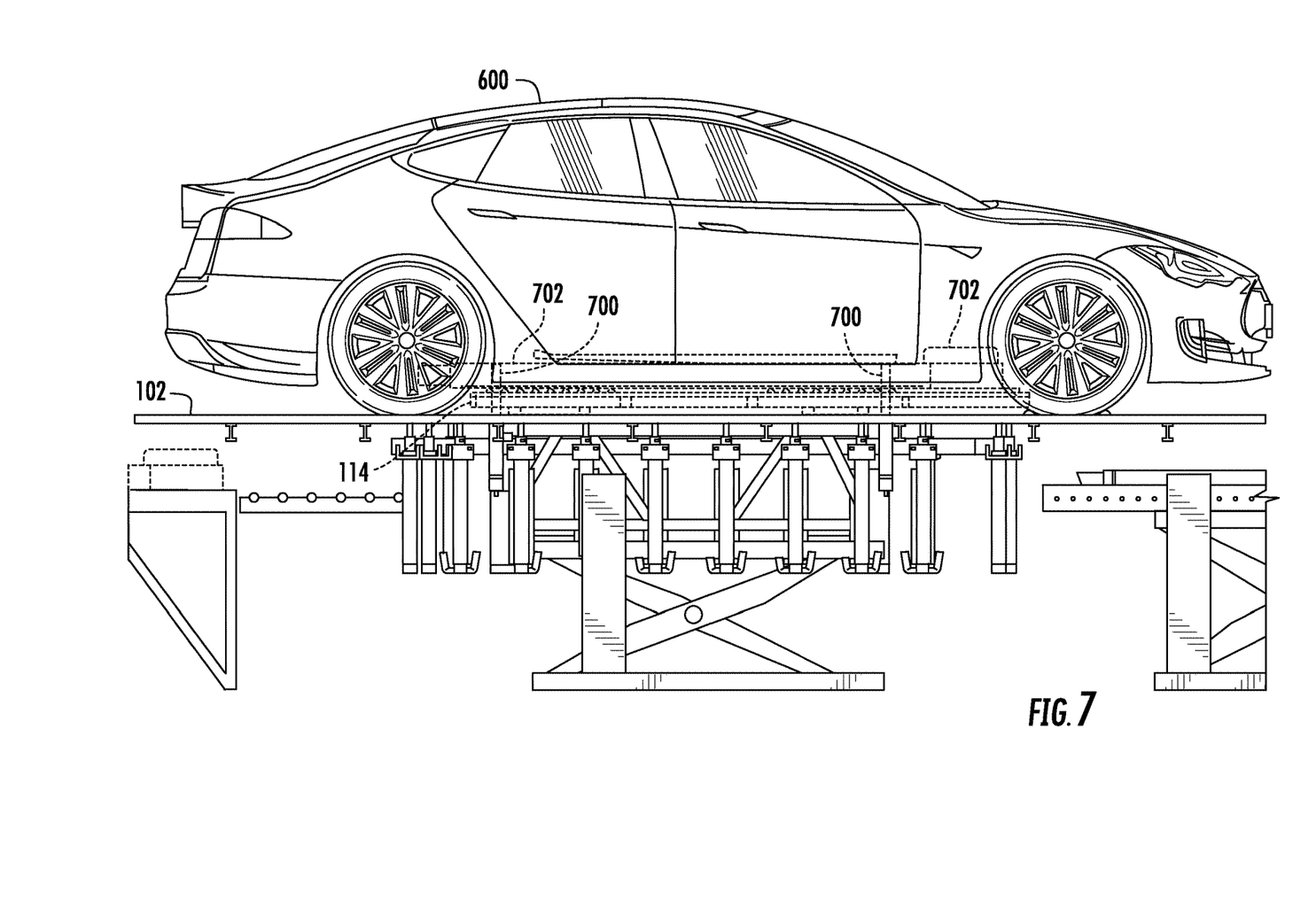
FIGS. 7-12 show examples of the vehicle of FIG. 6 being serviced using the battery pack lift system of FIG. 3.

FIG. 6 shows an example of a vehicle 600 on the battery-swapping station 100 of FIG. 1. The vehicle is shown transparently so as to illustrate examples of the underlying structures. Particularly, the vehicle's wheels have been guided into the correct position in the sideways direction (sometimes referred to as the y-direction). Moreover, one or more wheel chocks (not shown) can be used to obstruct the vehicle's motion in the forward direction (sometimes referred to as the x-direction) so as to properly line up the vehicle with the opening in the ramp. The platform 114 has rollers 602 that facilitate sliding battery packs onto, and off of, the platform during the service. The platform 114 also has openings 604 that correspond to the pattern of fasteners on the battery pack. During service, the openings allow nutrunners access to each respective fastener location for fastening or unfastening the battery pack.

Figure 13:
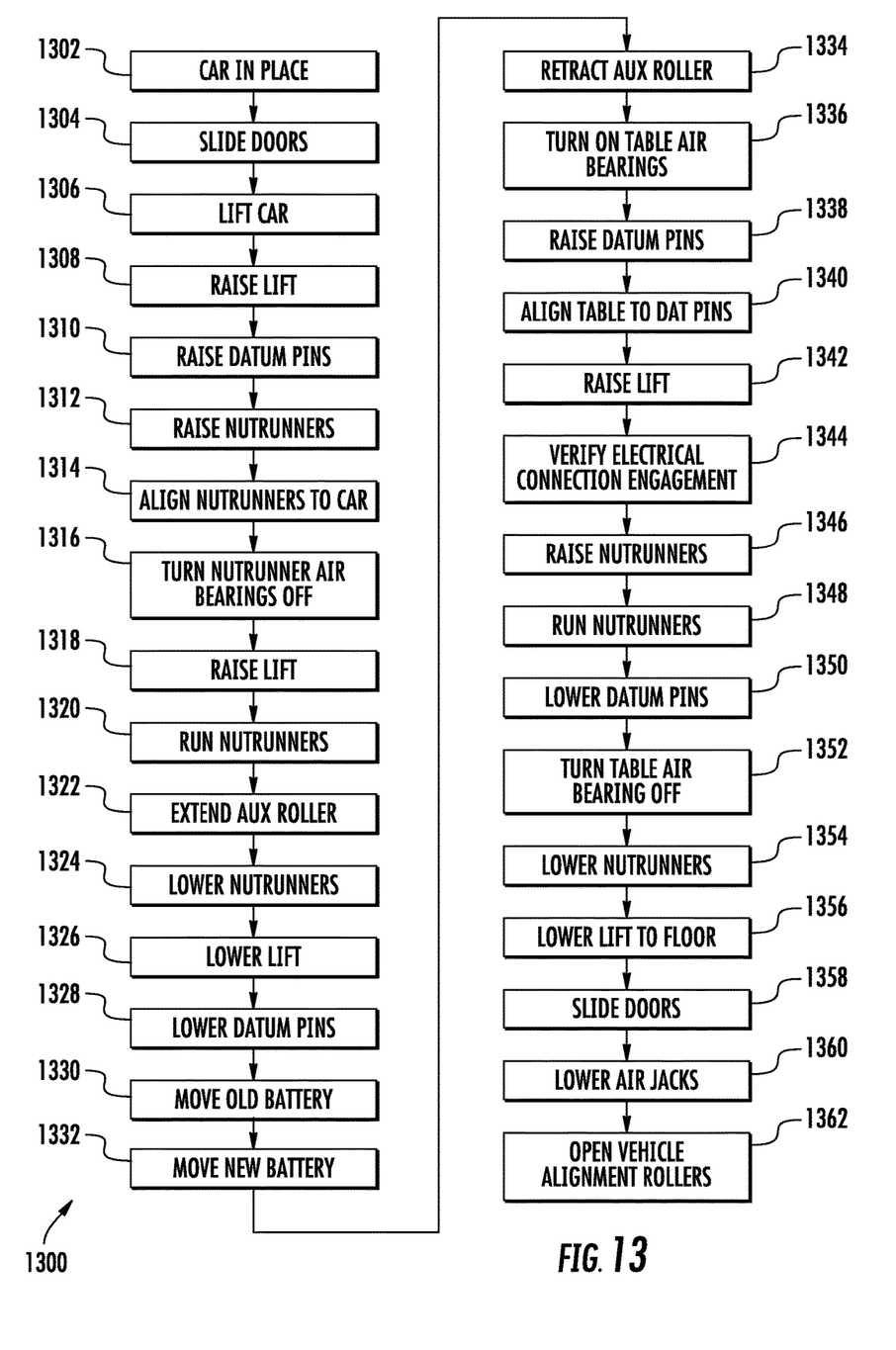
FIG. 13 shows an example of a method for swapping battery packs on vehicles.

FIGS. 7-12 show examples of the vehicle of FIG. 6 being serviced using the battery pack lift system of FIG. 3. FIG. 13 shows an example of a method 1300 for swapping battery packs on vehicles. The structures in the illustrated battery swap station will now be exemplified using steps of the method 1300.

At 1302, the car is placed in the correct position. For example, this can involve directing the vehicle into position using one or more guides and/or wheel chocks. The vehicle can be propelled by its own drive unit (i.e., one or more electric motors) until stopped by the above described mechanical structures.

At 1304, a door in the ramp is slid open. For example, one or more doors 606 (FIG. 6) adjacent the platform 114 can be slid open by pneumatic or hydraulic force. The opening of the door(s) can expose air jacks to be used in lifting the vehicle. As another example, the sliding door(s) provide additional room for the platform to move vertically and/or horizontally as part of servicing the battery pack.

At 1306, the car is lifted. In some implementations, jacks 700 are mounted on the ramp 102 so that when raised they contact the underside of the car and thereby lift the car. For example, four jacks can be used, positioned so that they engage respective jack pads of the vehicle when raised. The jacks can lift the body of the car upward from its normal state when parked. For example, the wheels can remain in contact with the ramp also in the raised position, due to the suspension. The jacks can use any suitable power technique, including pneumatics and/or hydraulics.

At 1308, the lift is raised. For example, the scissor lift 300 (FIG. 3) can be energized and brought to a raised position, thereby raising also the frame 302 which sits on the lift, the rack 304 which is attached to the frame, the nutrunners 306 that are mounted on the rack, and the platform 114 that sits on the frame. Doing so places the platform near the bottom surface of a battery pack 702 (FIG. 7) underneath the vehicle.

As mentioned earlier, the nutrunner rack can be vertically moveable also relative to the frame, and the relative position between them before the lift is raised can be that the rack is in a lower position. That is, the starting position for the nutrunners can be that they are in a lowered position. Also, the air bearings 504 can be turned on at approximately this time; they allow the nutrunners freedom to be adjusted in a horizontal direction.

At 1310, one or more datum pins can be raised. For example, the frame 302 can have alignment pins 316 (FIG. 3) that can be raised or lowered in a vertical direction as needed. The datum pins can help align the nutrunners and a battery pack relative to each other.

Figure 8:
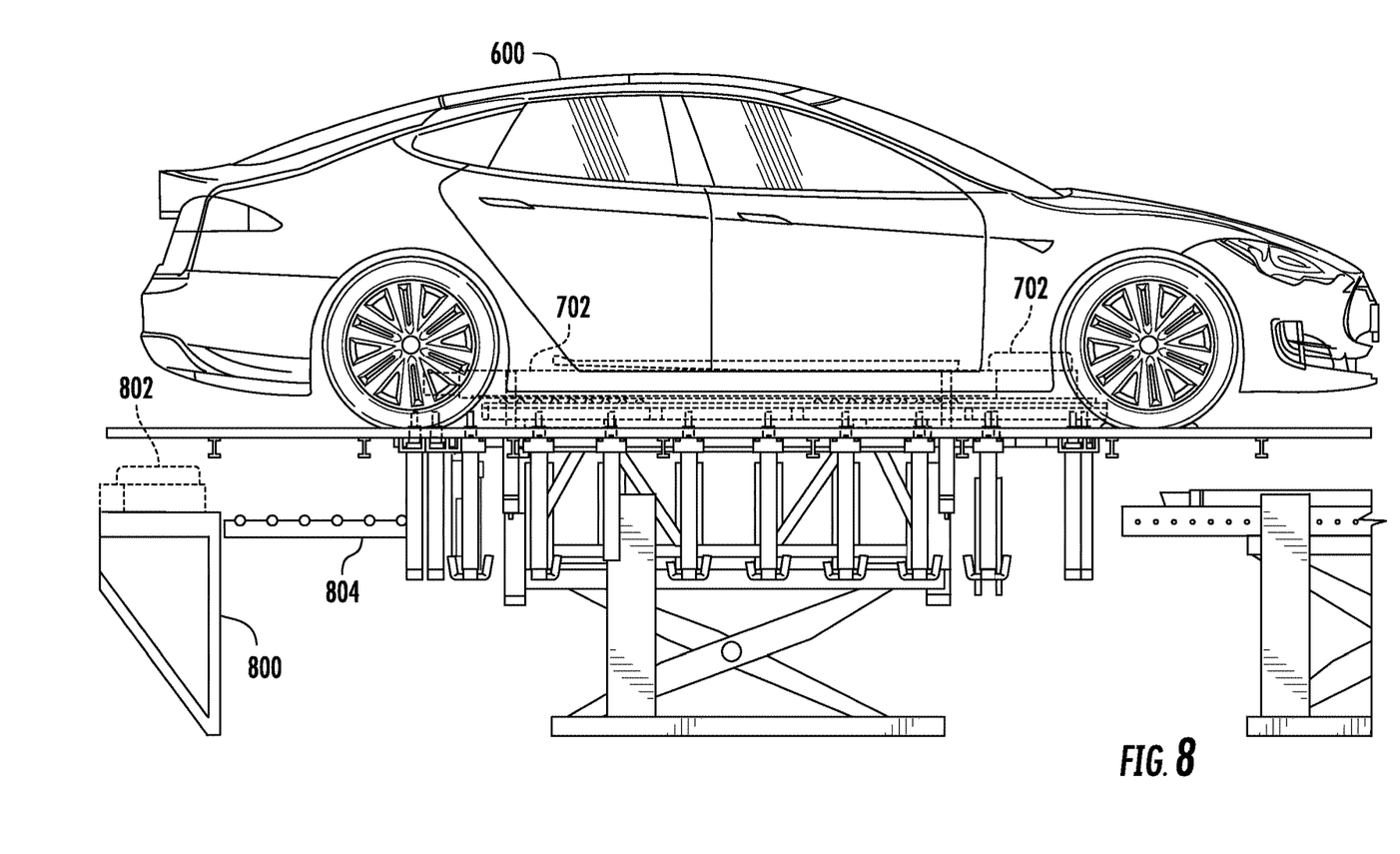

At 1312, the nutrunners can be raised. For example, this can be done using the lifts 502 (FIG. 5) on the frame 302. The raising brings the nutrunners to the approximate operating position near the respective fasteners of the battery pack 702, for example as illustrated in FIG. 8.

At 1314, the nutrunners are aligned to the vehicle. For example, a technician can manually adjust the rack 304 (and the frame 302), using the ability to move provided by the nutrunner air bearings 504, so that each nutrunner aligns with its corresponding fastener on the battery pack. The datum pins can help ensure the correct positioning of the nutrunners. In other implementations, an automated alignment mechanism can be used, for example by way of laser guidance or a camera-based optical recognition system.

At 1316, the nutrunner air bearings are turned off. That is, the air bearings 504 are deactivated so that they no longer allow relative motion between the rack 304 and the scissor lift 300. This deactivation preserves an alignment between the nutrunners and the vehicle, based on the nutrunners having been matched to the fasteners of the present battery pack, so that the nutrunners do not need to be realigned to the vehicle when attaching the new battery pack, which is to be done shortly afterwards.

At 1318, the lift is raised. For example, this can advance the platform 114 somewhat upward so that it engages the bottom surface of the battery pack. Thereby, as soon as the battery pack is no longer attached to the vehicle, the platform, and the rest of the lift system, will support the weight of the battery pack to prevent it from falling due to gravity.

At 1320, the nutrunners are run. For example, pneumatic pressure can be applied to the nutrunners 306 so that they apply the necessary amount of torque to unfasten the bolts (or nuts, etc.) by which the battery pack is attached to the vehicle. In some implementations, each nutrunner can be configured to automatically detect the presence of the corresponding nut (or bolt, etc.) at each fastening point, and the nutrunners are then run only after such presence has been confirmed. As noted, when this step is complete the battery pack is resting on the platform.

At 1322, an auxiliary roller can be extended. With reference to FIG. 8 as an example, an auxiliary rack 800 can have a new battery pack 802 sitting thereon, waiting to be mounted on the vehicle 600. In some implementations, the auxiliary rack can be the scissor lift 204 (FIG. 2), thereby allowing the new battery pack to be fetched from a storage location of a different height than the battery lift in its lower position. Particularly, the auxiliary rack can have an extendable roller 804 on one side thereof, and this roller can be extended to bridge the gap between the lift system and the auxiliary rack.

At 1324, the nutrunners can be lowered. For example, this can be done using the lifts 502, thereby lowering the rack 304 and the nutrunners 306 from the vehicle, but not the frame 302 or the platform 114, on which the old battery pack 702 is resting.

Figure 9:
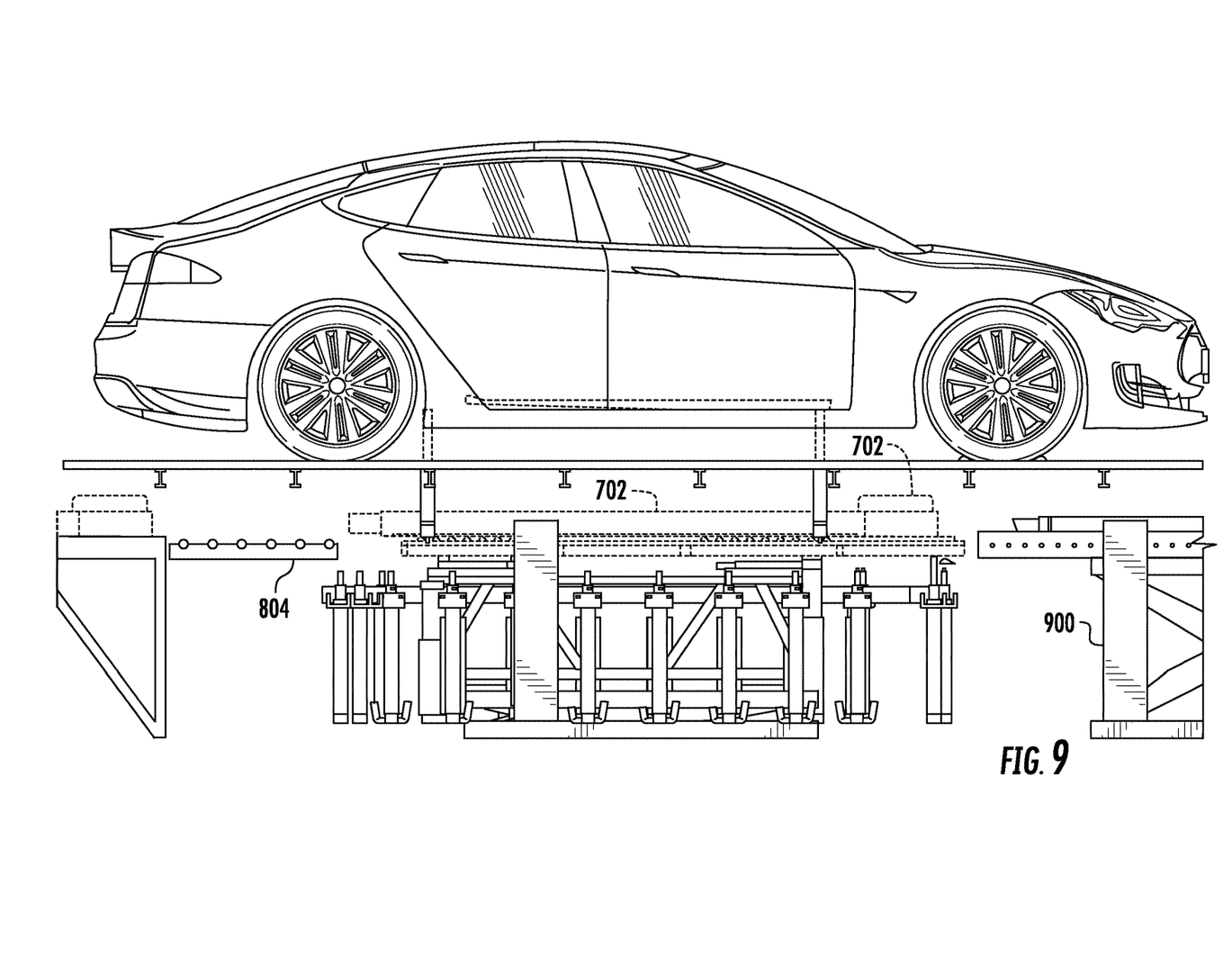

At 1326, the lift is lowered. This is done using the scissor lift 300, and thereby lowers the old battery pack 702 from the vehicle. FIG. 9 shows an example of the appearance of the lift system after the old battery pack 702 has been lowered. The lift is lowered to level the old battery pack with the auxiliary roller 804.

Lowering the battery pack can disconnect one or more couplings. One or more other disconnects can be used in some implementations. For example, separate quick disconnects can be used for respective high-voltage connection, low-voltage connection and a coolant connection. When the battery pack is successfully mounted onto the vehicle, any quick disconnects on the vehicle are then properly connected with corresponding disconnects on the new battery pack. This can ensure proper connection of high voltage, low voltage and liquid coolant to the vehicle. For example, the vehicle's internal system can check whether there is any water intrusion into the battery pack, or whether there are any short circuits. If no errors are detected, the system can close a connect that supplies the high voltage to the vehicle.

At 1328, the datum pins are lowered. For example, lowering the datum pins can be necessary to allow the old battery pack to be moved out of the way, and to bring in the new battery pack.

At 1330, the old battery pack is moved. The battery pack can be moved by manual force and/or by one or more pieces of power equipment. In some implementations, the battery pack can be moved using rollers on top of the platform, and similar rollers on top of an adjacent rack 900, to allow the old battery pack to be moved out of the way before remaining operations. The old battery pack can then be recharged and/or serviced, as needed, and/or moved to a different geographical location. For example, the adjacent rack 900 can be the rack 208 (FIG. 2).

Figure 10:
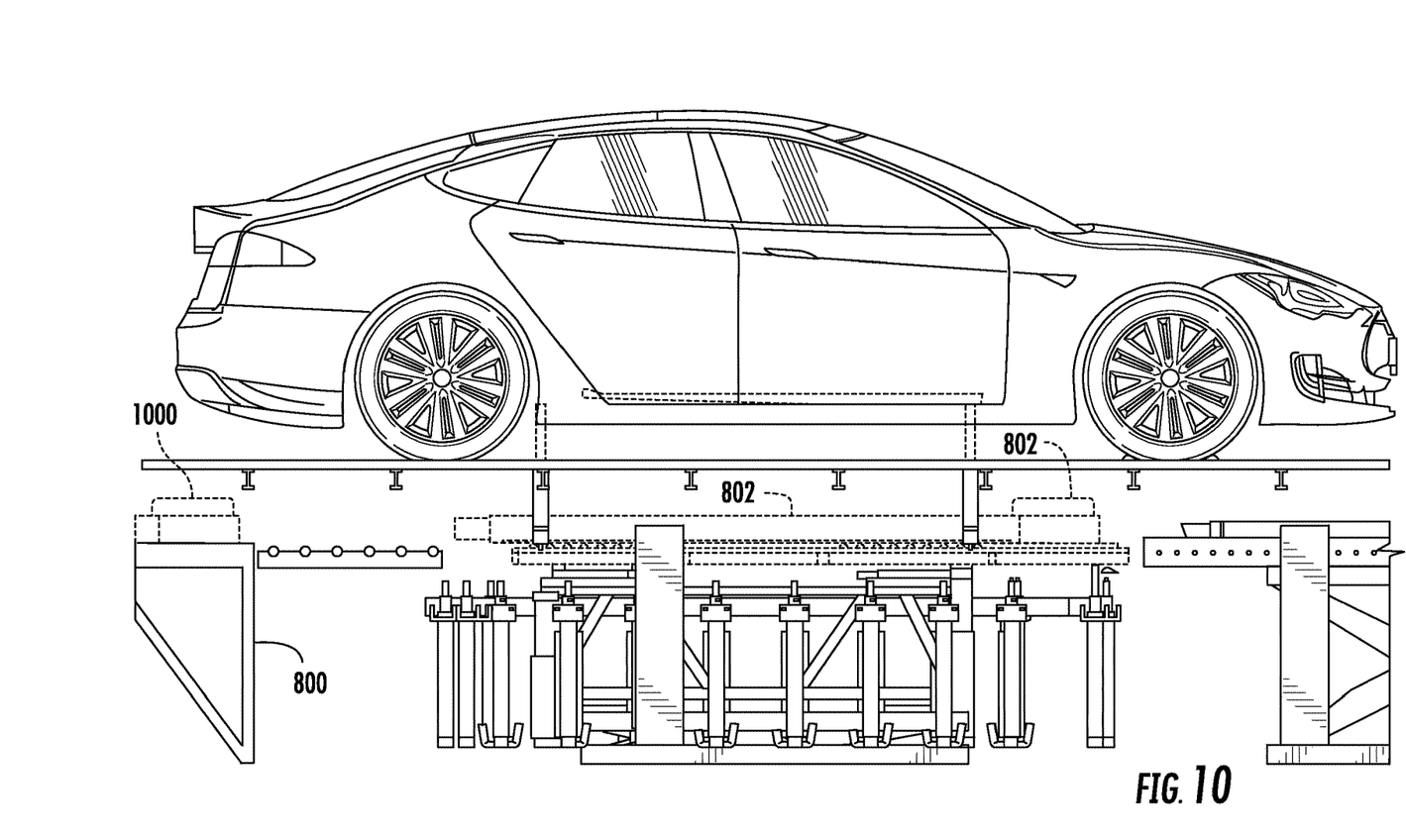
Figure 11:
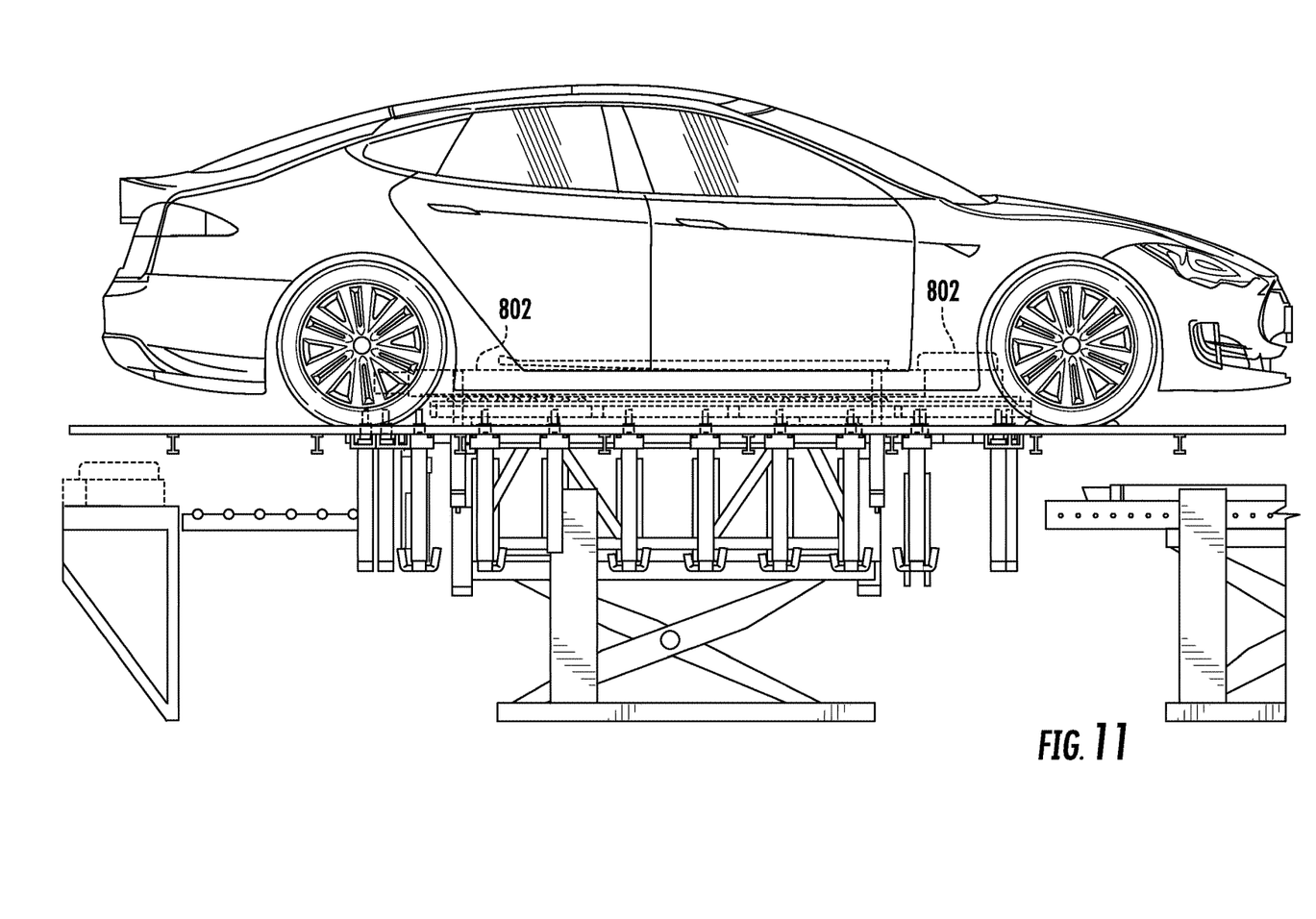
Figure 12:
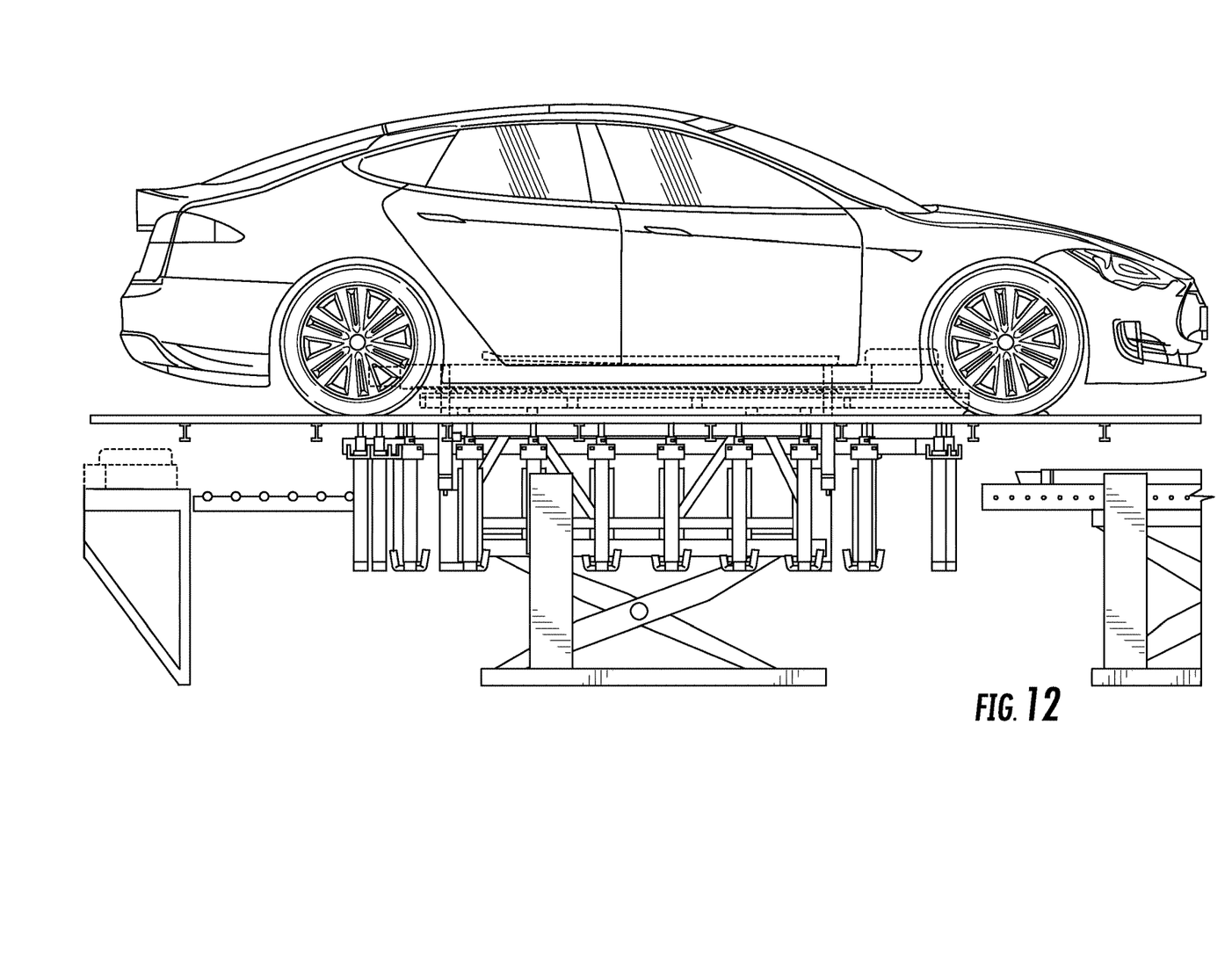

At 1332, the new battery pack is moved. For example, FIG. 10 shows that the new battery pack 802 is now positioned on top of the lift system (and the old battery pack is no longer visible in this illustration). On the auxiliary rack 800, yet another battery pack 1000 is currently shown. For example, this can be done in preparation for servicing the next vehicle, or for attaching more than one battery pack onto the same vehicle (for a chassis having such a configuration), or the other new battery pack can be held in close proximity in case the installation of the new battery pack 802 proves unsuccessful for any reason.

At 1334, the auxiliary roller is retracted. For example, this can provide additional space near the lift system for its upcoming operations, and can allow personnel to move around underneath the vehicle.

At 1336, the table air bearings are turned on. For example, this can involve energizing the air bearings 310 that are positioned between the platform 114 and the rest of the lift system. That is, these air bearings allow the new battery pack 802 to horizontally move relative to the lift system.

At 1338, the datum pins are raised. As noted above, the alignment between the lift system (the scissor lift, frame, rack and nutrunners) and the vehicle was preserved by turning off the nutrunner air bearings at 1316. Thus, when the datum pins are now being raised, they essentially reflect what the proper orientation of the new battery pack 802 should be so as to match up with the vehicle.

At 1340, the table is aligned to the datum pins. That is, by way of running the air bearings 310 between the platform (i.e., table) and the rest of the lift system, the battery pack can be moved horizontally as needed so as to match the datum pins, thereby obtaining the correct (preserved) alignment from the old battery pack. The need to move the new battery pack into this alignment can arise because the new battery pack may be sitting somewhat askew on the auxiliary rack, for example.

At 1342, the lift is raised. For example, this involves the scissor lift 300 as mentioned in earlier examples, and brings the new battery pack close to the vehicle underbody. Particularly, at this point the new battery pack can have its necessary connections made to the vehicle. For example, electrical and coolant connections can be established.

At 1344, the electrical connection engagement can be verified. For example, the battery pack's electrical contactors are coupled to the corresponding contactors on the vehicle in order to supply electric energy to the vehicle, and this connection can be confirmed (e.g., by using a low-voltage connection to verify that no conditions unsafe for high-voltage operation are detected).

At 1346, the nutrunners are raised. This can be done in a similar way as at 1312, by raising the lifts 502. Afterwards, the lift system can have the appearance shown in FIG. 11, with the new battery pack 802 now ready to be attached to the vehicle.

At 1348, the nutrunners are run. This fastens the new battery pack to the vehicle. The nutrunners are configured so that they apply the proper amount of torque in fastening the battery pack.

At 1350, the datum pins are lowered.

At 1352, the table air bearings can be turned off.

At 1354, the nutrunners can be lowered. For example, this is done using the lifts 502. Afterwards, the lift system can have the appearance shown in FIG. 12, with the new battery pack 802 now ready to be attached to the vehicle.

At 1356, the lift is lowered to the floor. Here, the scissor lift 300 is lowered, thereby also lowering the frame, rack and the nutrunners mounted thereon.

At 1358, the doors are slid shut. For example, this gives the vehicle wheels surfaces to roll over in exiting the battery swap station.

At 1360, the air jacks are lowered. This brings the vehicle down to again rest of the surface of the ramp.

At 1362, the vehicle alignment rollers are opened. In some implementations, this involves repositioning one or more vehicle guides and/or opening wheel chocks. As another example, when the vehicle's rear wheel stance is wider than that of its front wheels, the guides can be opened to allow the vehicle to drive forward in exiting the station. If the station is instead designed for the vehicle to pull out in reverse, no moving of the rollers/guides may be necessary.

With reference again to FIG. 2, the following high-level process can be performed. Fresh battery packs are stored on the storage rack 206 in preparation for servicing vehicles at the swapping station. When a vehicle is to have its battery pack exchanged, the scissor lift 204 can be adjusted to the height of one of the shelves, and the fresh battery pack can be loaded (e.g., rolled) onto the scissor lift. In some implementations, the scissor lift is mobile (e.g., by way of wheels at the bottom), and this allows the storage rack to be placed some distance away from the point of exchange. Using the lift system 202, the old battery pack is removed from the vehicle, for example as described above. The old battery pack is then loaded (e.g., rolled) from the lift system onto the rack 208, and the new battery pack is loaded onto the lift system and mounted onto the vehicle. After verifying the connections, the vehicle can be given the clear signal to exit the swapping station. In some implementations, the vehicle's driver can remain in or near the vehicle during this process, or a valet can take over the vehicle at some earlier point in the process. The old battery pack is thereafter serviced, if necessary, and recharged for future use. For example, the battery pack can be placed on the storage rack for charging, or it can be charged at a separate place and thereafter placed in storage.

In some implementations, two or more types of battery packs can be serviced by the battery-swapping system. For example, such battery pack types can have a common external form factor and equivalent quick disconnects, but may have different energy capacity.

A battery-swapping system can be implemented on top of a trailer for increased mobility. Generally, the battery-swapping operations should be performed in an enclosed or at least covered location. For example, a trailer can be custom built with sides that pop out for increased space, and ramps on either side so the vehicle can be driven in and out of the battery-swapping facility.

Depleted batteries can be charged at the location of the swapping system (e.g., using grid power or other electric resource) or fully charged battery packs can be delivered to the location.

A number of implementations have been described as examples. Nevertheless, other implementations are covered by the following claims.

What is claimed is:

1. A method of exchanging a battery pack of a vehicle, the method comprising:

positioning a battery pack lift system and the vehicle relative to each other, the battery pack lift system having a frame including a base and a rack mounted on the base and moveable with respect to the base, the rack including a plurality of nutrunners mounted thereon according to a battery pack fastener pattern for the vehicle and a lift configured to raise and lower the frame with regard to the vehicle, wherein each of the plurality of nutrunners is configured to selectively tighten and loosen a respective battery pack fastener of a plurality of battery pack fasteners;

aligning the frame to a first battery pack on the vehicle, the alignment created using a first air bearing mounted on the base and positioned between the frame and the lift;

unfastening the first battery pack using the plurality of nutrunners and removing the first battery pack from the vehicle;

aligning a second battery pack to the frame using a second air bearing mounted on the base, wherein the second battery pack obtains the alignment created for the first battery pack;

bringing the second battery pack to the vehicle using the lift; and fastening the second battery pack using the plurality of nutrunners.

2. The method of claim 1, wherein the battery pack lift system has a ramp configured for the vehicle to drive thereon, and an opening in the ramp for a platform mounted on the frame, wherein the frame and the lift are positioned underneath the opening, the method further comprising moving the platform at least vertically using the lift as part of removing the first battery pack from the vehicle and bringing the second battery pack to the vehicle.

3. The method of claim 2, wherein the platform has rollers, the method further comprising, after removing the first battery pack from the vehicle, rolling the first battery pack off of a first side of the platform, and, before aligning the second battery pack to the frame, rolling the second battery pack onto the platform on another a second side of the platform.

4. The method of claim 3, wherein the first side of the platform and the second side of the platform are opposite each other and wherein the first and second battery packs are rolled in a common direction.

5. The method of claim 1, further comprising moving the rack at least vertically relative to the base as part of unfastening the first battery pack and fastening the second battery pack.

6. The method of claim 1, further comprising, before aligning the frame to the first battery pack, extending at least one alignment pin mounted on the frame, and using the alignment pin in aligning the second battery pack so as to obtain the alignment created for the first battery pack.

* * * * *